United States Patent [19]

Watson

[11] Patent Number: 4,638,662
[45] Date of Patent: Jan. 27, 1987

[54] TANK LEAKAGE DETECTOR

[75] Inventor: Edward P. Watson, Hamilton Square, N.J.

[73] Assignee: Western Geophysical Company of America, Houston, Tex.

[21] Appl. No.: 796,885

[22] Filed: Nov. 12, 1985

[51] Int. Cl.⁴ .................................... G01F 23/00
[52] U.S. Cl. .................. 73/302; 73/40.5 R; 73/1 H
[58] Field of Search ............ 73/40.5 R, 49.2, 302, 73/1 H

[56] References Cited

U.S. PATENT DOCUMENTS

| | | | |
|---|---|---|---|
| 867,994 | 10/1907 | Murphy | 73/302 |
| 3,230,769 | 1/1966 | Carver et al. | 73/302 |
| 4,182,178 | 1/1980 | Nolte | 73/299 |
| 4,386,524 | 6/1983 | Vest et al. | 73/299 |
| 4,454,759 | 6/1984 | Pirkle | 73/299 |

Primary Examiner—Jerry W. Myracle
Assistant Examiner—Hezron E. Williams
Attorney, Agent, or Firm—Robert E. Lowe

[57] ABSTRACT

A method and apparatus for detecting a change in the liquid level in a liquid storage tank, such as an underground hydrocarbon storage tank. A gas line is inserted just below the level of the liquid in the tank, and a second interconnected gas line is placed in a small liquid cup located on the surface. The differential pressure between the two lines is measured and used to compute the level in the tank. A second measurement taken hours later reveals any change in level indicating a leak. Provision is made to accurately zero the apparatus at each measurement to insure precision.

6 Claims, 3 Drawing Figures

TANK LEAKAGE DETECTOR

BACKGROUND OF THE INVENTION

This invention relates to an apparatus and technique for determining changes in the liquid level of a storage tank with extreme accuracy.

Many liquid petroleum products are stored in very large quantities, frequently in underground tanks. One concern with underground liquid storage is the possibility that the tank may develop a leak which is not observable on the surface. It is a special concern when the leak is one which is relatively minor over a short period of time but which left undetected and unrepaired can result in very substantial leakage over a long period of time.

Because of concerns of petroleum products and other liquids escaping into ground water aquifers, government regulations require strict monitoring of underground storage tanks and provisions to detect even minor leaks as quickly as possible. Since visual inspection is not possible in underground storage, leakage detection must depend upon very accurate measurements of the liquid level in the tank from one day to another to ensure that a small quantity of the liquid is not leaking out of the tank over time.

The problem is compounded by the fact that underground tanks hold a large volume of liquid and that a small leak will not result in a significant change in the level of liquid in the large tank. For that reason a small leak is extremely difficult to measure. One such technique which has been developed is illustrated in U.S. Pat. No. 4,182,178 which discloses the use of a sensitive manometer to detect changes in the surface level of the liquid. While this technique is useful with some kinds of petroleum products, a problem arises when attempting to use the technique with gasoline products containing alcohol. Typically the manometer fluid used is a mixture of alcohol and water proportioned to have a precise specific gravity relevant to the gasoline in the tank. When the gasoline itself contains alcohol the intermingling of the manometer fluid and the gasoline/alcohol mixture destroys the predictability and accuracy of the measuring system.

SUMMARY OF THE INVENTION

The present invention overcomes the shortfalls of the prior art by providing a liquid level measuring system wherein contact between the liquid being stored underground and any measuring liquid is eliminated. Moreover, the apparatus and method of the present invention provide for zeroing the apparatus at the time each reading is taken, thereby providing a highly accurate and extremely repeatable measurement of liquid level.

The object and advantages of the invention are obtained by providing an apparatus which includes a dip tube configured to be inserted into the liquid in the tank at a level just below the surface. A second dip tube in fluid communication with the first is located above the surface and placed into a second liquid container. A gas is passed through both tubes and the height of the second tube is adjusted to equalize the gas pressure in each tube. The depth of penetration into the liquid of the second tube is used to calculate the precise depth of penetration of the first tube into the stored underground liquid.

BRIEF DESCRIPTION OF THE DRAWINGS

The invention will be described in greater detail by reference to the accompanying drawings in which.

DESCRIPTION OF PREFERRED EMBODIMENTS

Figure 1:
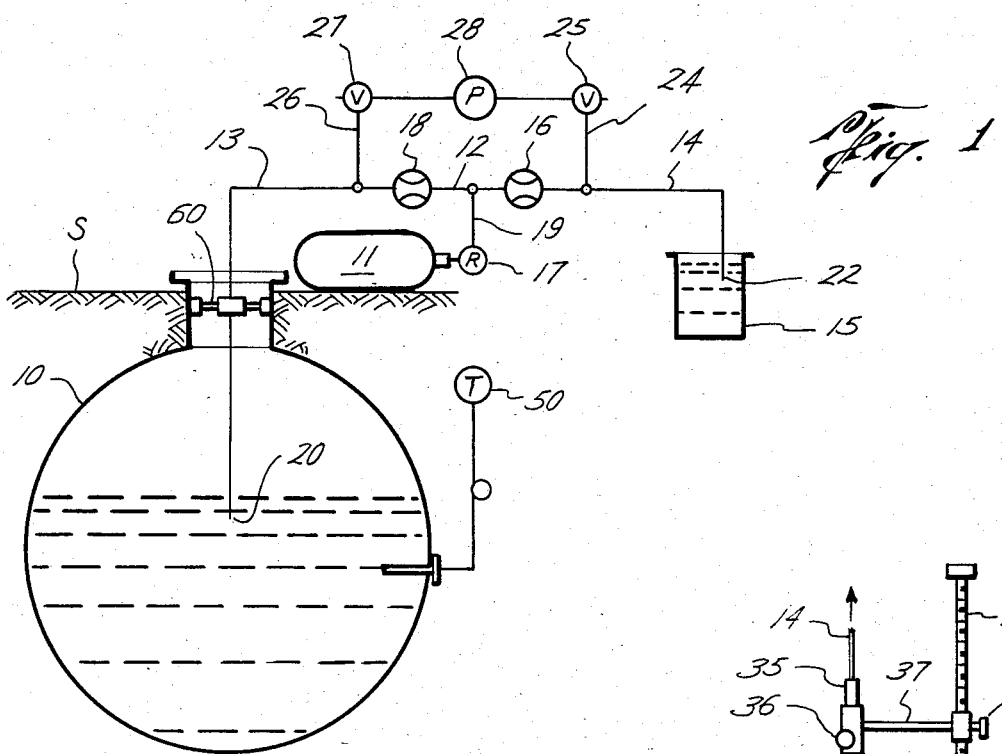
FIG. 1 is a schematic illustration of the present invention in operation.

With reference to FIG. 1, a liquid such as gasoline, fuel oil, diesel fuel, or gasohol, designated by the letter L is stored in an underground tank 10 located beneath the surface of the earth S. A source of pressurized gas such as air, nitrogen, or other suitable gas 11 is located on the surface. The pressurized gas passes through regulator 17, which may be a flow rotometer, through line 19 and into a common line 12.

Two matched orifices 16 and 18 are provided in the line 12. Downstream of the orifice 18 a gas line 13 extends into the underground tank 10, terminating in a tip 20. The tip 20 is held in a fixed vertical position in the tank by suitable holding or clamping means 60. Downstream of the orifice 16 a gas line 14 extends to a liquid filled cup 15, terminating in a tip 22.

An air line 26 branches off of line 13 and passes through a valve 27 and into one side of a highly sensitive differential pressure transducer 28. An air line 24 branches off of line 14 and passes through a valve 25, terminating in the other side of pressure transducer 28.

Figure 2:
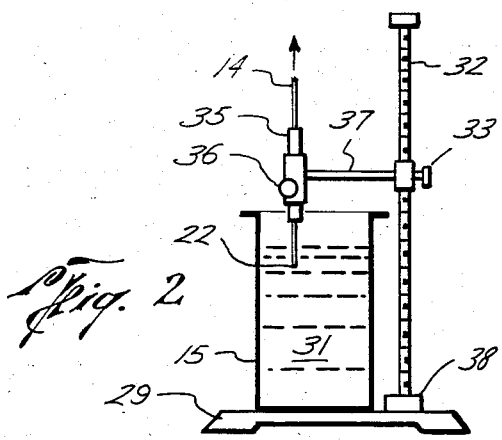
FIG. 2 is an enlarged view of the above ground portion of the dip tube.

Referring to FIG. 2 further details concerning the liquid measuring cup 15 are illustrated. The measuring cup 15 which is located at some convenient above ground location is supported on a base 29 which has attached to it a threaded rod 32. Supported on the rod 32 is a horizontal arm 37 which is vertically movable as the arm 37 is rotated in a bearing 38. Once the appropriate vertical position of the arm 37 is obtained it can be locked in place by means of a locking device such as a set screw 33.

Mounted on the end of arm 37 is an air line holding sleeve 35 through which passes the air line 14 terminating in tip 22. The holding sleeve 35 and hence the tip 22 can be moved vertically in minute amounts by adjustment of the micrometer knob 36. The knob 36 is provided with an integral scale in a manner well known in the micrometer art so that small changes in the vertical position of the tip 22 can be read from the scale as the knob 36 is rotated.

Figure 3:
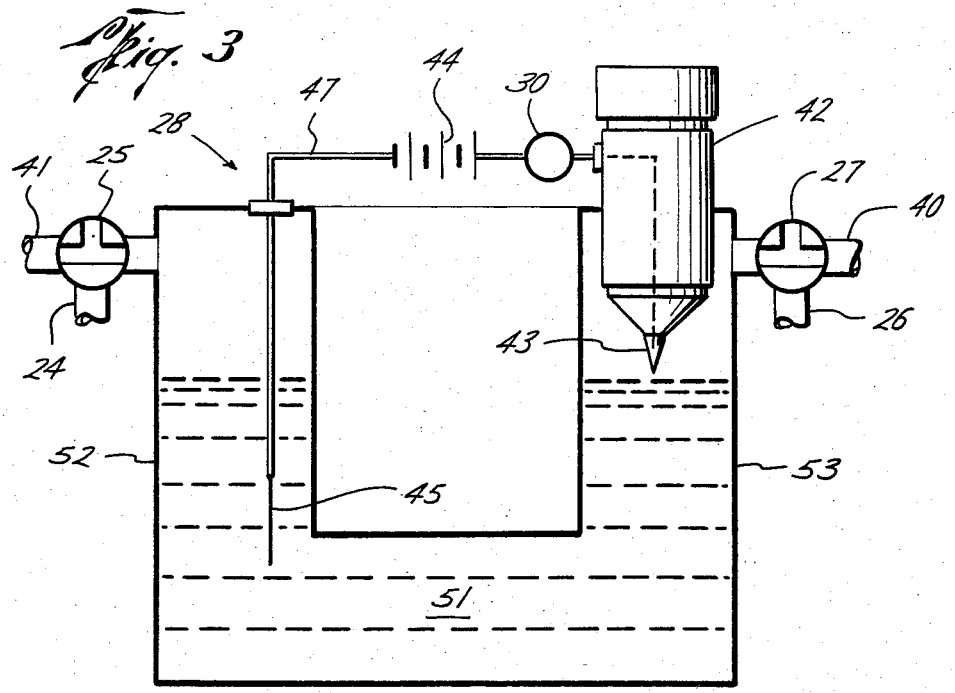
FIG. 3 is an enlarged schematic representation of a U-tube manometer useful in the invention.

If desired the pressure transducer 28 may be provided in the form of a U-tube manometer such as 28' shown in FIG. 3. One side of the manometer 28' is connected to air line 24 through valve 25. When the valve 25 is turned to an alternate position the manometer is vented to the atmosphere through line 41. Similarly the other side of the manometer is connected to air line 26 through valve 27, and that side is similarly vented to the atmosphere through line 40 when the valve 27 is so operated.

An electrically operated sensor 43 is mounted just above the liquid in one side of the manometer, the exact height of the sensor 43 being adjustable by rotation of knob 42. The sensor 43 is electrically connected to a power source such as battery 44 by line 46. A signal device such as a light or buzzer 30 emits a signal when the circuit is closed. An electrode 45 located in the liquid in the manometer is connected to the other side of the battery 44 through line 47.

OPERATION

In practicing the present invention some choice may be made concerning the type of pressure sensor 28 that is employed, and the precise operation of the device will vary somewhat depending on the type selected. The operation will first be explained in that configuration wherein a U-tube manometer of the type illustrated in FIG. 3 is employed.

The manometer 28' is partially filled with a suitable conducting liquid 51 with the liquid extending upwardly into arms 52 and 53 of the manometer. With both valves 25 and 27 positioned so as to vent manometer 28' to the atmosphere, sensor 43 is lowered toward the liquid surface in the arm 53 until it just touches the liquid surface. When it does it closes the detector circuit powered by battery 44 and including electrode 45, setting off a suitable signal to indicate a closed circuit condition. At that time the sensor 43 is raised a very small amount, just until the circuit is again opened.

After the air supply 11 has been turned on so that the desired volume and pressure of air is passing through regulator 17, lines 19 and 12, orifices 16 and 18, and lines 13 and 14, the valve 25 is operated to connect the manometer 28' to the cup side of the device. The tip 22 is lowered toward the surface of the liquid in the cup 15. As the tip 22 just makes contact with the surface, the pressure in lines 14 and 24 will increase, causing the liquid level in arm 52 of the manometer 28' down and the level in arm 53 up to once again close the circuit. The exact height of the tip 22 is read from the micrometer 36 which establishes the "zero" point for cup side of the device.

At this point the tip 20 is lowered a short distance into the liquid L in tank 10, perhaps on the order of about one inch. The clamping means 60 is actuated to hold the tip 20 in the selected vertical position. Valve 27 is operated to connect line 26 to the manometer and an increase in pressure in line 26 occurs proportional to the hydrostatic head pressure developed at tip 20. This causes the liquid level in arm 53 to drop and open the manometer circuit. To once again balance the circuit, the tip 22 is lowered into the liquid in cup 31 until the depth of the tip 22 generates the same hydrostatic head pressure as is present at tip 20. At that time the manometer liquid in arm 52 will be forced downwardly, raising the level in arm 53 until the manometer circuit is again closed. At that point, assuming the liquid L in tank 10 is the same as that in cup 31, the depth of tip 22 will be equal to the depth of tip 20.

Some suitable period of time is then allowed to lapse, perhaps on the order of several hours, during which time the position of tip 20 is retained rigidly, and no liquid is of course intentionally added or withdrawn from tank 10. A second reading is then taken using the same procedure regarding the zeroing and depth reading of tip 22 in cup 15. If no liquid has escaped from tank 10, the two readings should be identical. To the extent they differ, the change in level of liquid L in tank 10 indicates a leak, the precise rate and amount of which can be calculated with extreme accuracy Since the liquid in the tank 10 of interest is generally a volatile hydrocarbon such as gasoline, it may be impractical to use the identical liquid in the cup 15. In fact it is preferred to use water in the cup to greatly reduce volatility and flammability problems. When the liquids are different and the system pressures are balanced as described, the actual depth of the tip 22 will differ from the actual depth of the tip 20 by a factor related to the density or specific gravity of the two fluids. Since these are known quantities however, a mathematical correction is easily applied. Moreover, since the device and method is designed to measure a *change* in tank level, the fact that the liquid in the tank and the liquid in the cup are different from one another doesn't effect the result so long as each liquid remains the same for both measurements. Also, a temperature gauge 50 is provided so that liquid level in the tank 10 can be corrected for any change in tank temperature occurring between the first and second readings.

If desired, a sensitive differential pressure transducer, such as a variable reluctance transducer, may be substituted for the manometer 28'. In each case the zero point of the tip 22 on the liquid in the cup 15 would first be measured at each reading so that the repeatability of the accuracy is assured.

Since the device provides for the tip 20 to remain in a fixed position between the first and second reading and for the zero point of the tip 22 to be established each time a reading is taken, consistently repeatable results are obtained. The above ground micrometer adjustment of the tip 22 provides for reading its depth with extreme accuracy, such that the device is capable of detecting changes in the level of liquid in the tank 10 on the order of 0.05 gal/hr or less using two readings on the order of several hours apart.

What is claimed is:

1. A method for detecting a change in the amount of liquid in a storage tank comprising the steps of:
    (a) providing a source of gas at greater than atmospheric pressure;
    (b) positioning a gas line communicating with said gas source in said storage tank, the end of said gas line being below the surface of the liquid;
    (c) positioning a second gas line communicating with said gas source into a liquid filled cup, the end of said line being movable between a first position at the surface of the liquid and a second position below the surface;
    (d) sensing the differential pressure between said first and second gas lines and adjusting said second position of said second gas line until said differential pressure is zero;
    (e) computing the depth of the end of said first line from the observed depth of the end of said second line;
    (f) holding said first gas line in fixed position for a predetermined time; and
    (g) re-zeroing the differential pressure between said first and second lines after said predetermined time by repositioning the end of said second line and recalculating the depth of said first gas line.

2. The method of claim 1 wherein the step of sensing the differential pressure between said first and second gas lines comprises the sub-steps of:
    (a) positioning a differential pressure measuring instrument across said first and second gas lines;
    (b) venting said first gas line side of said instrument to the atmosphere;
    (c) positioning said second gas line at the liquid surface of said liquid filled cap to establish a "zero" reading;

(d) reconnecting said first gas line side of said instrument to first gas line.

3. An apparatus for detecting leakage in a storage tank by measuring a corresponding change in the liquid level in the tank, said apparatus comprising:
   (a) a source of gas at greater than atmospheric pressure;
   (b) a first gas line communicating with said source of gas and having a first tip;
   (c) a second gas line communicating with said source of gas and with said first gas line and having a second tip;
   (d) means for placing and holding said first tip in said storage tank and extending a first distance below the surface of the liquid in said tank;
   (e) a liquid filled cup;
   (f) means for supporting said second tip in said cup;
   (g) means including a scale for determining when said second tip is located at the surface of the liquid in said cup; and
   (h) means for sensing the differential pressure between said first and second gas lines;
   whereby said second tip is lowered into said cup until the pressure in said first and second gas lines is equalized and the depth of said first tip is calculated from the depth of said second tip.

4. The apparatus of claim 3 wherein said means for determining when said second tip is located at the surface of the liquid in said cup includes first and second valves located in said first and second gas lines respectively, said valve being operable between a first position allowing gas to flow from said source to said first and second tips and a second position wherein said gas is vented to atmosphere before it can reach said first and second tips.

5. The apparatus of claim 3 wherein said means for sensing the differential pressure comprises a U-tube manometer.

6. The apparatus of claim 3 wherein said means for sensing the differential pressure comprises a variable reluctance transducer.

* * * * *